United States Patent [19]

Barresi et al.

[11] Patent Number: 4,580,716
[45] Date of Patent: Apr. 8, 1986

[54] APPARATUS AND METHOD FOR VAPOR PHASE SOLDER REFLOW

[75] Inventors: Anthony J. Barresi, Hammonton; John T. Catania, Burlington; William F. Sweeney, Jr., Blackwood, all of N.J.

[73] Assignee: RCA Corporation, Princeton, N.J.

[21] Appl. No.: 661,788

[22] Filed: Oct. 17, 1984

[51] Int. Cl.⁴ ............... B23K 31/02; B23K 35/38
[52] U.S. Cl. .............................. 228/219; 228/180.1
[58] Field of Search ............... 228/218–220, 228/123, 180.1, 180.2, 6.2; 432/26, 197, 198; 34/36, 37; 118/58, 61

[56] References Cited

U.S. PATENT DOCUMENTS

| | | | |
|---|---|---|---|
| 2,438,721 | 3/1948 | Spencer | 113/112 |
| 3,621,550 | 11/1981 | Colestock | 29/156.7 A |
| 3,882,596 | 5/1975 | Kendziora et al. | 228/200 |
| 4,231,508 | 11/1980 | Wagner | 228/219 |
| 4,389,797 | 6/1983 | Spigarelli et al. | 118/61 X |
| 4,436,242 | 3/1984 | Shisler et al. | 228/264 |

FOREIGN PATENT DOCUMENTS 2027062  2/1980  United Kingdom ............... 228/219

OTHER PUBLICATIONS

"Chemical and Environmental Aspects of Condensation Reflow Soldering," by L. J. Turbini et al., Western Electric, Engineering Research Center, PO Box 900, Princeton, NJ 08540.
HTC Model IL-12 Operator's Manual, pp. 1–8; 2–3; 2–7; 2–11; and 5–12.

Primary Examiner—Kuang Y. Lin
Attorney, Agent, or Firm—Joseph S. Tripoli; George E. Haas; William Squire

[57] ABSTRACT

A solder reflow process including vaporized fluorinated organic liquid such as FC-70 is dehumidified by pressurizing the vapor chamber with dry nitrogen and blowing the dry nitrogen against the conveyor belt and article to be soldered as they pass through the inlet throat.

16 Claims, 3 Drawing Figures

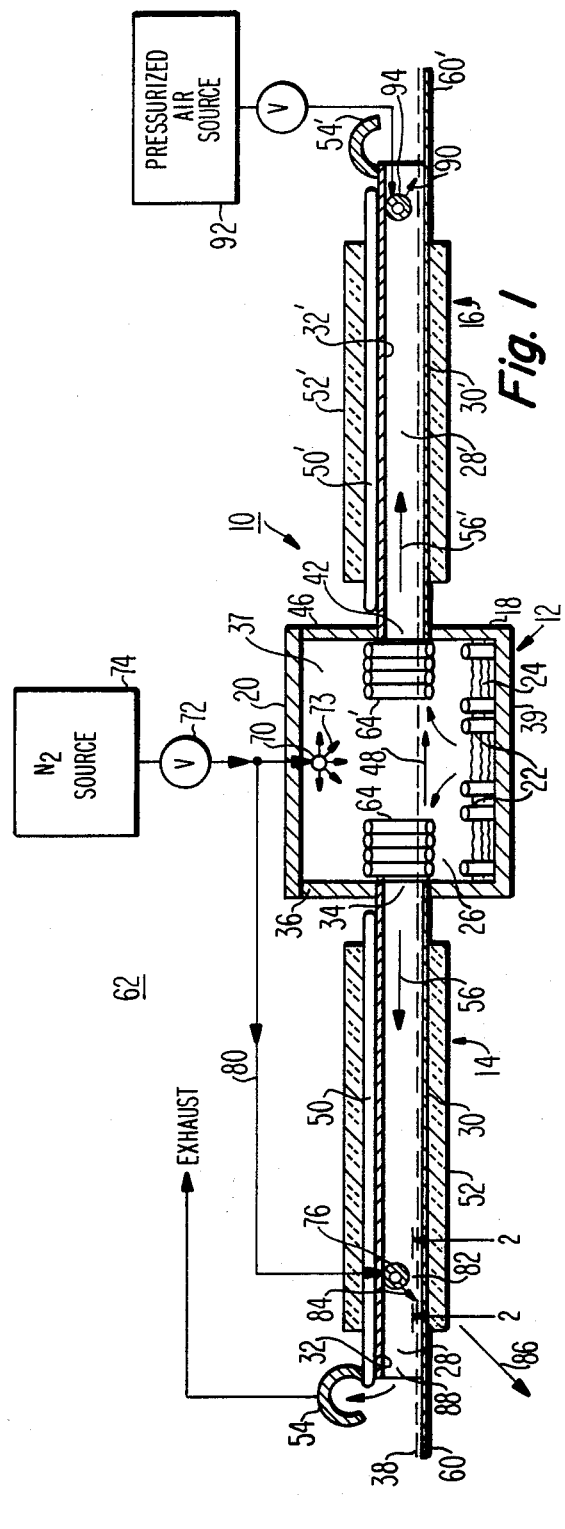
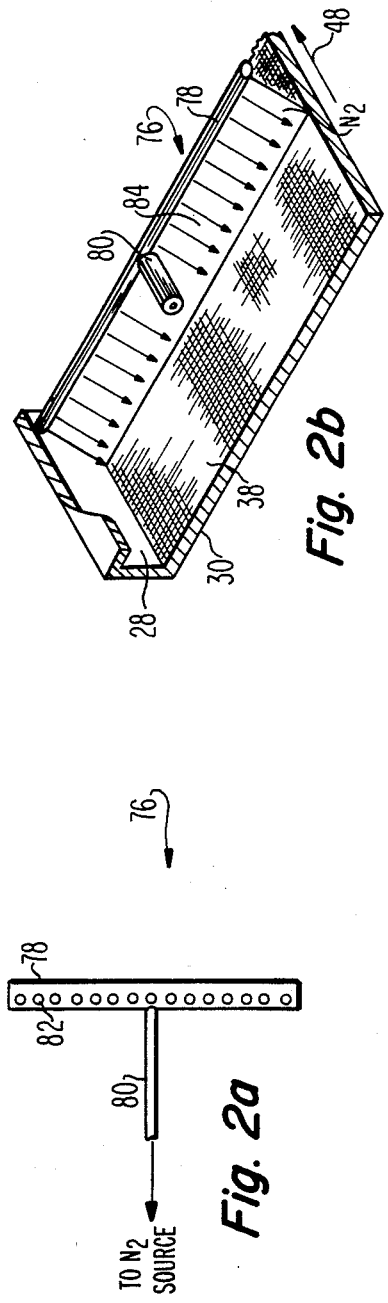

APPARATUS AND METHOD FOR VAPOR PHASE SOLDER REFLOW

The U.S. Government has rights in this invention pursuant to Contract No. N00024-81-C5145 awarded by the Department of the Navy.

This invention relates to a reflow soldering system in which an article to be soldered is passed through hot vapors produced by a boiling working fluid, the vapors transferring the heat of condensation to the article.

Of interest is copending application Ser. No. 348,692, filed Feb. 16, 1982, entitled "Apparatus and Method for Applying Solder Flux to a Printed Circuit Board," by Leonard Nelson et al., and assigned to the assignee of the present invention.

Vapor phase solder reflow, sometimes referred to as condensation reflow soldering, is a widely employed, highly useful mass soldering technique. In a vapor phase solder reflow system, printed circuit board conductors are coated with a solder paste. Components are placed on the board with their leads on the pasted conductors. The printed circuit board assembly is passed through the hot vapors which transfers their heat of condensation to the printed circuit board assembly. That heat melts the solder paste. When the paste melts it wets and adheres to the component leads, connecting the leads to the board conductors. Components that are employed with such a system may be of the "leadless" type such as disclosed, by way of example, in U.S. Pat. No. 4,436,242. The soldering of such components is generally referred to as "surface mounting."

The vapor phase reflow system has an enclosed chamber in which a working fluid is boiled. The working fluid comprises a nonoxidizing, thermally stable, nonflammable fluorinated organic compound liquid which when boiled produces a high temperature vapor having a relatively high heat of condensation. The chamber includes inlet and outlet ports which are always open to the ambient atmosphere and through which pass the printed circuit board carrying leadless components resting on the solder paste coated conductors. A conveyor belt, which is inert to the working fluid such as a Teflon coated fiberglass mesh, conveys the printed circuit board and its components through the inlet port into the chamber, through the boiled working fluid vapors, and thence through the exit port.

Because such working fluids are toxic, the vapor phase solder reflow systems employ a venting system at the inlet and exit ports for exhausting stray vapors which may pass through the ports. Located within the chamber are One widely used working fluid in this kind of a process employs a fluorocarbon compound comprising $(C_5F_{11})_3N$, known in the industry as fluorinert FC-70 in which fluorinert is a registered trademark. That working fluid compound tends to decompose in the vapor chamber, react with moisture in the chamber, creating hydrofluoric acid. The hydrofluoric acid tends to attack the metal elements in the chamber such as the cooling coils and the heaters used to boil the working fluid.

It is postulated in an article entitled "Chemical and Environmental Aspects of Condensation Reflow Soldering," by L. J. Turbini et al., Western Electric, Engineering Research Center, P.O. Box 900, Princeton, N.J., 08540 that the working fluid decomposes as follows:

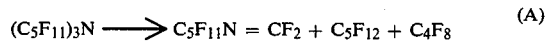

$$(C_5F_{11})_3N \longrightarrow C_5F_{11}N = CF_2 + C_5F_{12} + C_4F_8 \quad\quad (A)$$

FC70          (I)          (II)          (III)

where I is a perfluoroimin, II is a perfluoroalkane, and III is a perfluoroalkene.

Hydrofluoric acid is formed when unsaturated perfluoroalkenes, III above, react with water according to the following equation:

$$(CF_3)_2C=CF_2 + H_2O \rightarrow (CF_3)_2CHCOOH + 2HF \quad\quad (B)$$

The hydrofluoric acid is responsible for the degradation of the vapor phase soldering equipment. The article suggests chemical measures be taken to neutralize the acid. The reaction A always results when FC-70 is used. Reaction B is thought to be preventable by minimizing the volume of water vapor in the chamber.

The manufacturer of such soldering equipment, for example, has attempted, albeit unsuccessfully, to minimize reaction B by condensing the water vapor in the chamber. To do this, in one such commercial vapor phase solder reflow system, an additional moisture condensation cooling coil is located in the chamber to liquify the water vapors. A water absorbent material is adjacent to the coils to absorb the condensation. Eventually, the absorbent material becomes saturated and needs to be replaced. The problem of corrosion of the elements in the chamber has not been significantly reduced by the use of the additional cooling coil. For one reason, it has not always been possible to remove the absorbent prior to saturation and further even upon such removal, significant corrosion of the chamber elements due to the acid has been observed.

According to the present invention, a thermally stable, nonoxidizing, nonflammable fluorinated organic liquid is boiled at a temperature above the melting point of solder to be melted. The boiled liquid vapors are substantially confined within a given chamber and all of the water, including liquid water and water vapor, in the chamber is substantially removed while the chamber is in communication with the ambient atmosphere. This is accomplished by sufficiently pressurizing the chamber with a dry inert gas above the ambient atmosphere pressure to preclude moisture from entering the chamber yet maintaining the pressure differential between the chamber and the ambient atmosphere sufficiently low to minimize substantial loss of the vapors to the ambient atmosphere. An article including the solder to be melted is then passed through the chamber. Moisture is removed from the ambient atmosphere surrounding the article while the article is being passed into the chamber to preclude admission of moisture.

In the drawing:

FIG. 1 is a sectional elevation diagrammatic view of an apparatus operated and constructed in accordance with an embodiment of the present invention;

FIG. 2a is a plan view of a portion of the apparatus of FIG. 1 taken along lines 2—2; and FIG. 2b is an isometric view of a portion of the embodiment of FIG. 1 illustrating the operation of the portion of FIG. 2a.

In FIG. 1, vapor phase solder reflow system 10 comprises a central processing tank 12, an inlet throat 14, and an outlet throat 16. Tank 12 includes a housing 18 and a removable cover 20 secured to the housing 18 side walls including walls 36, 37 and 46, and a fourth wall (not shown), connected to bottom wall 39. The housing 18 and cover 20 may be made of stainless steel.

Located within and secured to tank 12 are a plurality of heating elements 22 coupled to a power source (not shown) and submerged in the liquid working fluid 24 at the bottom of tank 12. Elements 22 boil the liquid working fluid 24 which is of a compound normally used in a vapor phase solder reflow system. For example, one such working fluid is FC-70 mentioned above. This working fluid boils at a temperature above the melting point of solder. The elements 22 when energized boil the fluid 24, vaporize it and fill the tank 12 chamber 26 with the vapor.

Inlet throat 14 is similar in construction to outlet throat 16 and the description of inlet throat 14 is representative. Parts in throat 16 which are similar to parts on throat 14 have the same reference numerals as throat 14 and are primed. Throat 14 comprises an elongated rectangular conduit 28 having a bottom wall 30 and a parallel upper wall 32. Walls 30 and 32 are joined by two upstanding vertical walls to form a continuous enclosed passageway open at each end. Conduit 28 is gas sealed at one end to tank wall 36 to form a tank inlet port 34. The other end 88 is open to the ambient atmosphere 62. Conduit 28' at one end is sealed to tank wall 46 to form an outlet port 42. The other end is open to the ambient atmosphere 62. The open ends of conduits 28 and 28' have bottom wall extensions 60 and 60', respectively.

Teflon coated fiberglass mesh conveyor belt 38 passes through throats 14 and 16 and tank 12. Belt 38 slides on bottom wall 30 of conduit 28 and wall 30' of conduit 28'. The belt 38 also slides on a support (not shown) within tank 12 chamber 26. Belt 38 is driven by a drive system (not shown) in direction 48 from the ambient atmosphere 62 through conduit 28, tank inlet port 34, tank outlet port 42, and thence conduit 28' of outlet throat 16 into the ambient atmosphere 62.

Upper wall 32 of conduit 28 includes cooling coils 50 thermally conductively attached thereto for cooling the passageway formed by conduit 28. The exterior surface of conduit 28 is surrounded with an insulation blanket 52 to thermally insulate the passageway from the ambient atmosphere 62. Vent pipe 54 is connected to an exhaust system (not shown) and is located adjacent to conduit 28 end 88 for exhausting gases and vapors which may flow through conduit 28 in direction 56. The description of the inlet throat 14 thus far is identical to the outlet throat 16.

Conduits 28 and 28' and tank chamber 26 via inlet and outlet ports 34 and 42, respectively, are continuously open to the ambient atmosphere 62. The passageways of conduits 28 and 28' are sufficiently large to accept articles to be processed in the tank 12, and for example, may be 12×1 inches in transverse section normal to direction 56, with system 10 being commonly referred to as a 12-inch unit.

A pair of cooling coils 64 and 64' comprising coiled water lines are located within chamber 26 of tank 12 adjacent to the corresponding inlet port 34 and outlet port 42, respectively. Coils 64 and 64' each have coil interior transverse dimensions somewhat larger than the corresponding transverse interior dimension of the conduits 28 and 28'. Belt 38 and articles carried thereon to be processed in the tank 12 pass through the coils prior to entering the central region of chamber 26 and upon exiting from the central region. The coils 64 and 64' receive cooling water from a source (not shown) to condense vaporized working fluid 24 passing within the coils into ports 34 and 42, respectively. This condensation is to minimize loss of vapors which otherwise would pass into the conduit passageways of throats 14 and 16. The coils 64 and 64' cool the adjacent chamber 26 atmosphere sufficiently to condense those vapors tending to leave chamber 26 and return them to the bottom of the tank 12. The system described above is commercially available.

Water vapor that is present in chamber 26 is also condensed by the coils 64 and 64'. Such vapor and condensation tends to combine with the perfluoroalkenes III discussed in the introductory portion above. The resultant reaction produces hydrofluoric acid which tends to react with and corrode the various metal elements within the tank 12.

To preclude such detrimental corrosion, a moisture removing system is provided according to the present invention. This system includes a dry nitrogen gas inlet nozzle 70 passing through wall 37 into chamber 26. Nozzle 70 is coupled through a valve and pressure regulator valve 72 to a source of dry nitrogen 74. By "dry nitrogen" is meant nitrogen containing negligible moisture, for example, 10 parts moisture to one million parts nitrogen, at ambient pressure. The nitrogen is flowed through inlet 70 at a flow rate sufficient to elevate the pressure of chamber 26 above the ambient atmosphere 62 pressure. By way of example, in a 12-inch system as described above, valve 72 supplies dry nitrogen at a flow rate of 10 cubic feet/hour for 15 minutes to purge the chamber 26 of all moisture. The pressurized dry nitrogen has a sufficiently high flow rate value such that it creates a differential pressure in the tank relative to ambient atmosphere which differential tends to force the moisture laden atmosphere out of the chamber 26 through the inlet throat 14 and outlet throat 16 in respective directions 56 and 56'. Later, the flow rate is reduced to minimize loss of the working fluid vapors to the ambient atmosphere. This will be discussed more fully below.

However, the conveyor belt 38 being of mesh construction has pockets that tend to carry moisture into the chamber 26. To preclude such carrying of moisture into chamber 26, an additional nitrogen blower device 76 is included adjacent to conduit 28 and 88. Device 76, FIGS. 2a and 2b, comprises an apertured pipe 78 connected at its midsection to the nitrogen source 74 through valve 72, FIG. 1, by hose 80. Pipe 78 includes a linear array of equally spaced apertures 82 each having a given diameter. The apertures 72 may be, for example, 0.020 inch in diameter and spaced at ⅜ inch spacing for a pipe 78 of a 0.250 inch internal diameter in the above-described 12-inch system 10.

The pipe 78 abuts the inner surface of upper wall 32 and extends the full transverse width of conduit 28 in a direction normal to direction 56. The aperture 82 dimensions and spacing are such that a substantially continuous essentially single fan-like stream 84 of nitrogen is formed by the individual streams produced by apertures 82. Stream 84 is blown against belt 38 at an approximately uniform stream velocity thereacross. The apertures 82 are sufficiently close and of such diameter to insure all of belt 38 is blown by the stream 84 to blow ambient atmosphere and, thus moisture, out of the belt 38 pockets.

Reference is made to the copending application mentioned above for more detailed description of the construction of a device such as device 76 for producing a single gas fan-like stream 84 of essentially uniform velocity from a plurality of apertures. The blowing device described therein is for other purposes, but the principles of its operation and construction are similar. The fan-like stream 84 should have sufficient velocity to blow through the mesh of belt 38 to dry all of the belt including its interface with conduit 28 bottom wall 30.

In FIG. 1, the apertures 82 are oriented to direct the nitrogen stream 84 therethrough in direction 86 somewhat toward conduit 28, inlet 88, and toward bottom wall 30 and belt 38. The stream 84 removes moisture from the pockets in the belt mesh and in the article being processed and drive the moisture out of throat 14 into the ambient atmosphere 62. Pipe 54 and the connected exhaust system removes such moisture laden nitrogen as well as the fluid 24 vapors that may have passed from chamber 26 through coil 64 and conduit 28.

The cooling coils 50 coupled to conduit 28 tend to condense the working fluid 24 vapors that may have escaped into conduit 28 past coil 64 and also any water vapor that might be present. The water cooling coils 50' of outlet throat 16 cool outlet conduit 28' for a similar purpose. The throats are inclined somewhat toward tank 12 to drain such condensate through the inlet and outlet ports into chamber 26. Because of the presence of device 76 and its proximity to conduit 28 end 88, negligible moisture is condensed in throat 14 precluding drainage of such moisture into chamber 26. Vent pipe 54' of outlet throat 16 tends to exhaust the working fluid 24 vapors that escape through conduit 28'.

A blower device 90 similar in construction as device 76, FIG. 2, is located in the passageway of conduit 28' near its outlet. Device 76 is connected to pressurized air source 92 for providing a pressurized fan-like stream 94 over the belt 38 to cool articles carried on the belt. Device 90 also smooths the molten solder on the article. Because the article processed in the tank 12 and located in the exit throat 16 is moving in directions 56' away from tank 12, a nitrogen blower need not be located in exit conduit 28'. Also, because of the elevated pressure of the dry nitrogen gas supplied from source 74 to chamber 26, the atmosphere within chamber 26 tends to flow through outlet throat 16 in direction 56' as well as through inlet throat 14 in direction 56. Therefore, relatively little gas from the ambient atmosphere 62 tends to enter the respective inlet and exit throats 14 and 16.

The positive pressure of the nitrogen atmosphere in chamber 26 is set at a sufficiently low differential pressure relative to that of atmosphere 62 by wetting the flow rate through nozzle 70 accordingly. That nitrogen flow rate through nozzle 70 is set sufficiently low so as to cause negligible loss of working fluid vapors through the throats into the exhaust pipes 54 and 54'. The flow rate, however, is set sufficiently high after purging of the tank 12 such that a positive pressure differential is maintained to preclude significant ambient atmosphere from entering tank 12 through the throats. Thus, negligible moisture laden gas from ambient atmosphere 62 enters into the chamber 26 once the chamber is purged of moisture while minimizing loss of the working fluid vapors in chamber 26.

After such purging occurs, nitrogen may be set at a reduced flow rate, for example, from 10 cubic feet/hour for purging to 5 cubic feet/hour for maintenance during operation, through the nozzle 70 and to the device 76 for maintaining the moisture free condition of chamber 26. The lower nitrogen flow rate is sufficient to provide a positive pressure in chamber 26 to preclude moisture flow into the chamber through throats 14 and 16 and from belt 38 and the article (not shown) to be processed in the tank 12 without flowing substantial amounts of working fluid vapor out of chamber 26. This is important because sufficient quantities of the vapors in the chamber must remain to be effective to transfer their heat to the article being processed.

As a result, chamber 26 is substantially free of all moisture while at the same time remains sufficiently saturated with the working fluid vapors necessary to melt solder on the article being processed. This absence of moisture either in condensate form or in vapor form prevents reaction with the decomposed substances of the working fluid 24 and therefore minimizes the formation of undesirable hydrofluoric acid.

A system constructed and operated in accordance with the present invention for a period of time, for example, a system operated six hours a day in a 30-day period was observed and exhibited relatively negligible corrosion of the various elements within tank 12 as compared to extensive corrosion occurring in the prior art dehumidification coil, described above.

In operation, prior to energizing the heating coils 22, nitrogen from source 74 is supplied to the chamber 26 purging the chamber for a time sufficient to eliminate substantially all moisture within the chamber. In the example described above, this can be 10 cubic feet/minute for 15 minutes for a 12-inch system having a chamber 26 volume of 2.3 cubic feet. After purging, elements 22 are energized to boil the working fluid 24. This boiling action creates a vaporized working fluid in chamber 26 which is completely saturated with that vapor. The flow rate of the nitrogen from source 74 is then reduced to an operating level such as 5 cubic feet/hour as discussed above.

Cooling water is supplied to the coils 64, 64' 50 and 50' to minimize escape of the working fluid vapors through the inlet and outlet throats 14 and 16, respectively. The belt 38 is moved in direction 48 through throats 14 and 16 and through chamber 26. The belt 38 which may have moisture in its pockets is passed through the fan-like stream 84 of nitrogen in conduit 28 which tends to dry the belt and remove moisture from the pockets prior to the belt passing through significant portions of conduit 28 and prior to the belt entering chamber 26, the belt being continuously operated. That stream 84 also tends to blow that moisture laden atmosphere out of conduit 28 into the ambient atmosphere 62. Therefore, relatively negligible moisture is brought into the chamber by belt 38.

Articles to be processed are laid on the belt 38 at extension 60. Such an article may comprise a printed circuit board assembly as shown in U.S. Pat. No. 4,436,242 discussed above. The article passes through inlet throat 14, is dried by device 76 and thence passes through the chamber 26 in contact with the vapors of the working fluid 24. The latent heat of condensation of the vapor contacts the article, heating it and melting its solder. The article is continuously in motion and thence conveyed into the exit throat 16 from which it is removed at extension 60'.

The belt 38 is normally conveyed continuously at a given operating rate which may be four feet/minute in the present example. When the conveyor power is turned on, the exhaust system and the pressurized air source 92 are also turned on. The conveyor belt 38 has adjustable speeds. Not shown is a filtration system for removing contaminants and particulate matter as well as flux that may have washed off the article in passing through the system.

What is claimed is:

1. In a solder reflow process including boiling a thermally stable, nonoxidizing, nonflammable fluorinated organic liquid to form a vapor at an elevated temperature, passing an article to be soldered through a chamber containing said vapor to transfer the heat of condensation from the vapor to the article to melt solder on said article, cooling the atmosphere of the chamber at the locations where said article is passed into and out of said chamber to condense the vapor to preclude its escape to the ambient atmosphere, said liquid and vapor including components which tend to combine with moisture to form undesirable acid, said cooling tending to condense water vapor in said chamber to thereby form said acid, the improvement comprising injecting a dry inert gas into said chamber to remove substantially all said water vapor from said chamber to preclude said acid forming and threafter maintaining the pressure of said chamber with said dry inert gas above the pressure of ambient atmosphere at a sufficient differential to preclude moisture from entering said chamber while precluding substantial loss of said vapor in the presence of said pressure differential.

2. The process of claim 1 wherein said gas is nitrogen.

3. The process of claim 1 further including the step of passing said article through a conduit prior to said passing through said chamber, and additionally injecting said inert gas into said conduit to preclude passage of moisture through said conduit and into said chamber from the ambient atmosphere.

4. The process of claim 3 wherein said step of injecting gas into said conduit includes the step of blowing a fan-like stream of nitrogen against said article.

5. A process for melting solder comprising:
boiling a nonoxidizing, thermally stable, nonflammable fluorinated organic liquid at a temperature above the melting point of said solder;
substantially confining the vapors of said boiled liquid within a given chamber;
removing substantially all water including liquid water and water vapor from said chamber while the chamber is in communication with the ambient atmosphere by pressurizing the chamber with a dry inert gas at a pressure sufficiently above that of the ambient atmosphere to preclude moisture from entering said chamber and maintaining the pressure differential between said chamber and the ambient atmosphere sufficiently low to minimize substantial loss of said vapors to said ambient atmosphere;
passing an article including said solder to be melted through said given chamber; and
removing moisture from the ambient atmosphere surrounding said article prior to said passing to preclude admission of moisture during the processing of the article.

6. The process of claim 5 wherein said removing water step includes purging said chamber with nitrogen for a given time interval prior to said passing.

7. The process of claim 5 wherein said moisture removing step includes blowing a fan stream of a dry inert gas in a direction toward said article and away from said chamber prior to said passing.

8. The process of claim 5 wherein said organic liquid comprises $(C_5F_{11})_3N$.

9. The process of claim 5 wherein said organic liquid comprises a compound which tends to produce a component which upon decomposition reacts with water to form an acid.

10. The process of claim 5 further including the step of blowing ambient atmosphere in a direction toward said article and away from said chamber after said article passes through said chamber to cool said article.

11. A solder reflow apparatus comprising:
a thermally stable nonoxidizing, nonflammable fluorinated organic liquid having a boiling point above the melting point of solder,
means for boiling the thermally stable, nonoxidizing, nonflammable fluorinated organic liquid at a temperature above the melting point of said solder;
means for confining the vapors of said boiled liquid to a given chamber;
means for removing substantially all water from said given chamber;
means for passing an article including said solder to be melted through said given chamber; and
means for removing moisture from the ambient atmosphere surrounding said article immediately prior to said passing.

12. The apparatus of claim 11 wherein said means for removing all water include means for purging said chamber with a dry gas for a given time interval prior to said passing and said boiling.

13. The apparatus of claim 11 wherein said means for removing moisture includes means for blowing an array of streams of a dry inert gas in a direction toward said article and away from said means for confining prior to said passing.

14. A solder reflow apparatus comprising:
an enclosed chamber having an inlet port and an outlet port sufficiently large to receive an article to be processed by said apparatus, said ports being continuously open to the ambient atmosphere;
a thermally stable, nonflammable fluorinated organic liquid in said chamber having a boiling point above the melting point of solder;
heating means in said chamber for boiling said liquid;
cooling means inside said chamber surrounding each said port for condensing the vapors produced by said boiling liquid to preclude escape of said vapors through said ports to said ambient atmosphere;
conveyor means passing through said ports and chamber for conveying an article to be processed by the vapor produced by said boiling liquid; and
means for continuously injecting a dry inert gas into said chamber for producing a pressure in said chamber sufficiently greater than that of said ambient atmosphere to remove substantially all moisture from said chamber prior to and during said processing and sufficiently low to preclude escape of significant amounts of the boiled liquid vapors to the ambient atmosphere during said conveying.

15. The apparatus of claim 14 further including means for blowing said gas against said conveyor means and article in a direction away from and adjacent to said inlet port.

16. The apparatus of claim 14 wherein said means for continuously injecting includes means for injecting said inert gas at a first flow rate prior to said boiling and at a second flow rate lower than the first flow rate during said boiling to minimize loss of said vapors produced by said boiling.

* * * * *

UNITED STATES PATENT AND TRADEMARK OFFICE
CERTIFICATE OF CORRECTION

PATENT NO. : 4,580,716

DATED : April 8, 1986

INVENTOR(S) : Anthony John Barresi et al.

It is certified that error appears in the above-identified patent and that said Letters Patent is hereby corrected as shown below:

Column 1, line 53, after "chamber are" insert --water cooled coils adjacent to the inlet and outlet ports. The coils condense the working fluid vapor that tends to pass into the inlet and outlet ports from the chamber to prevent significant losses of the working fluid. The condensed vapors are returned to the bottom of the chamber where they are boiled and reused.--

Column 4, line 51, "72" should be --82--.

Column 5, line 50, "wetting" should be --setting--.

Signed and Sealed this

First Day of July 1986

[SEAL]

Attest:

DONALD J. QUIGG

Attesting Officer

Commissioner of Patents and Trademarks